(12) United States Patent
Ebe et al.

(10) Patent No.: US 11,474,332 B2
(45) Date of Patent: Oct. 18, 2022

(54) CONVERTER LENS, INTERCHANGEABLE LENS, AND IMAGE CAPTURING APPARATUS

(71) Applicant: CANON KABUSHIKI KAISHA, Tokyo (JP)

(72) Inventors: Hiroki Ebe, Utsunomiya (JP); Shinichiro Saito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 16/796,764

(22) Filed: Feb. 20, 2020

(65) Prior Publication Data

US 2020/0271903 A1     Aug. 27, 2020

(30) Foreign Application Priority Data

Feb. 27, 2019  (JP) ............................. JP2019-034283
Nov. 21, 2019  (JP) ............................. JP2019-210887

(51) Int. Cl.
*G02B 13/16*  (2006.01)
*G02B 9/10*   (2006.01)

(52) U.S. Cl.
CPC ............... *G02B 13/16* (2013.01); *G02B 9/10* (2013.01)

(58) Field of Classification Search
CPC . G02B 13/16; G02B 9/10; G02B 9/60; G02B 9/62; G02B 9/64
See application file for complete search history.

(56) References Cited

FOREIGN PATENT DOCUMENTS

| CN | 102645731 A | 8/2012 |
|---|---|---|
| CN | 105988188 A | 10/2016 |
| JP | S60-28614 A | 2/1985 |
| JP | S61-23110 A | 1/1986 |
| JP | 2-226212 A | 9/1990 |
| JP | 2013-250290 A | 12/2013 |
| JP | 2018-205443 A | 12/2018 |
| WO | 17/134928 A1 | 8/2017 |

*Primary Examiner* — Jack Dinh
(74) *Attorney, Agent, or Firm* — Canon U.S.A., Inc. IP Division

(57) ABSTRACT

A converter lens according to an exemplary embodiment of the present invention is a converter lens that has a negative refractive power and increases a focal length of an entire system. The converter lens includes a front group having a positive refractive power and a rear group having a negative refractive power, and the front group is a lens unit having a combined refractive power having a maximum positive refractive power in a case where the combined refractive power is obtained by combining a refractive power of each lens in order from the lens closest to an object toward an image side. At this time, a focal length of the front group, a focal length of the converter lens, and a lateral magnification of the converter lens when the converter lens is disposed on an image side of a master lens are determined as appropriate.

14 Claims, 10 Drawing Sheets

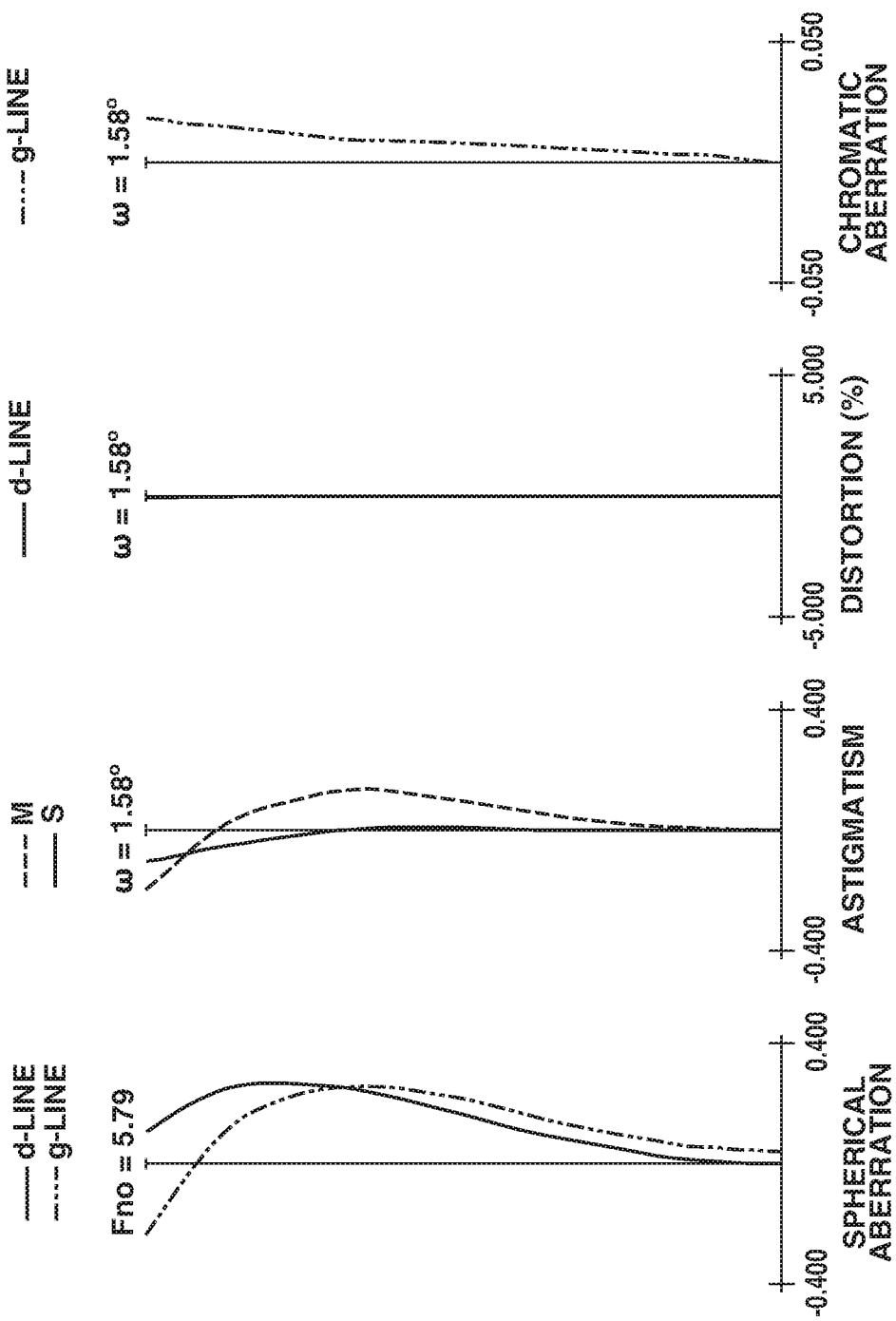

CONVERTER LENS, INTERCHANGEABLE LENS, AND IMAGE CAPTURING APPARATUS

BACKGROUND OF THE INVENTION

Field of the Invention

The present invention relates to a converter lens, an interchangeable lens, and an image capturing apparatus.

Description of the Related Art

Rear converter lenses (hereinafter, referred to as "converter lens") are known that are attached between an image capturing apparatus and an interchangeable lens including a master lens so that the focal length of the entire system increases.

WO 17/134928 discusses a converter lens consisting of a first lens unit having a positive refractive power, a second lens unit having a negative refractive power, and a third lens unit having a positive refractive power in this order from an object side to an image side. The converter lens is configured so that the converter lens can be used together with a master lens having a relatively short back focal distance.

In a case where the back focal distance of the master lens is short, the converter lens is disposed at a position where the height of a principal ray of off-axis light rays output from the master lens is relatively high. At this time, unless the refractive power of a lens group disposed on the object side in the converter lens and the refractive power of the entire converter lens are set as appropriate, the diameter of the lens group disposed on the image side in the converter lens increases and/or it becomes difficult to correct field curvature and magnification chromatic aberration.

The present invention is directed to providing a converter lens that is small in size and has high optical performance when the converter lens is disposed on an image side of a master lens.

SUMMARY OF THE INVENTION

According to an aspect of the present invention, a converter lens that has a negative refractive power as a whole and is disposed on an image side of a master lens so that a focal length of an entire system becomes longer than a focal length of the master lens alone. The converter lens includes five or more lenses. The five or more lenses consist of a front group having a positive refractive power and a rear group having a negative refractive power. The front group is a lens unit having a combined refractive power having a maximum positive refractive power in a case where the combined refractive power is obtained by a refractive power of each lens being combined in order from the lens closest to an object to an image side. The following conditional expression is satisfied:

$$0.10 < f1/(|EXT\_f| \times \beta) < 0.36$$

where f1 is a focal length of the front group, EXT_f is a focal length of the converter lens, and β is a lateral magnification of the converter lens when the converter lens is disposed on the image side of the master lens.

Further features of the present invention will become apparent from the following description of exemplary embodiments with reference to the attached drawings.

BRIEF DESCRIPTION OF THE DRAWINGS

FIG. 9 is an aberration diagram of when the infinite-distance object is in focus in a case where the converter lens according to the fourth exemplary embodiment is disposed on the image side of the master lens.

DESCRIPTION OF THE EMBODIMENTS

A converter lens and an image capturing apparatus according to each exemplary embodiment of the present invention will be described below with reference to the accompanying drawings.

Figure 1:
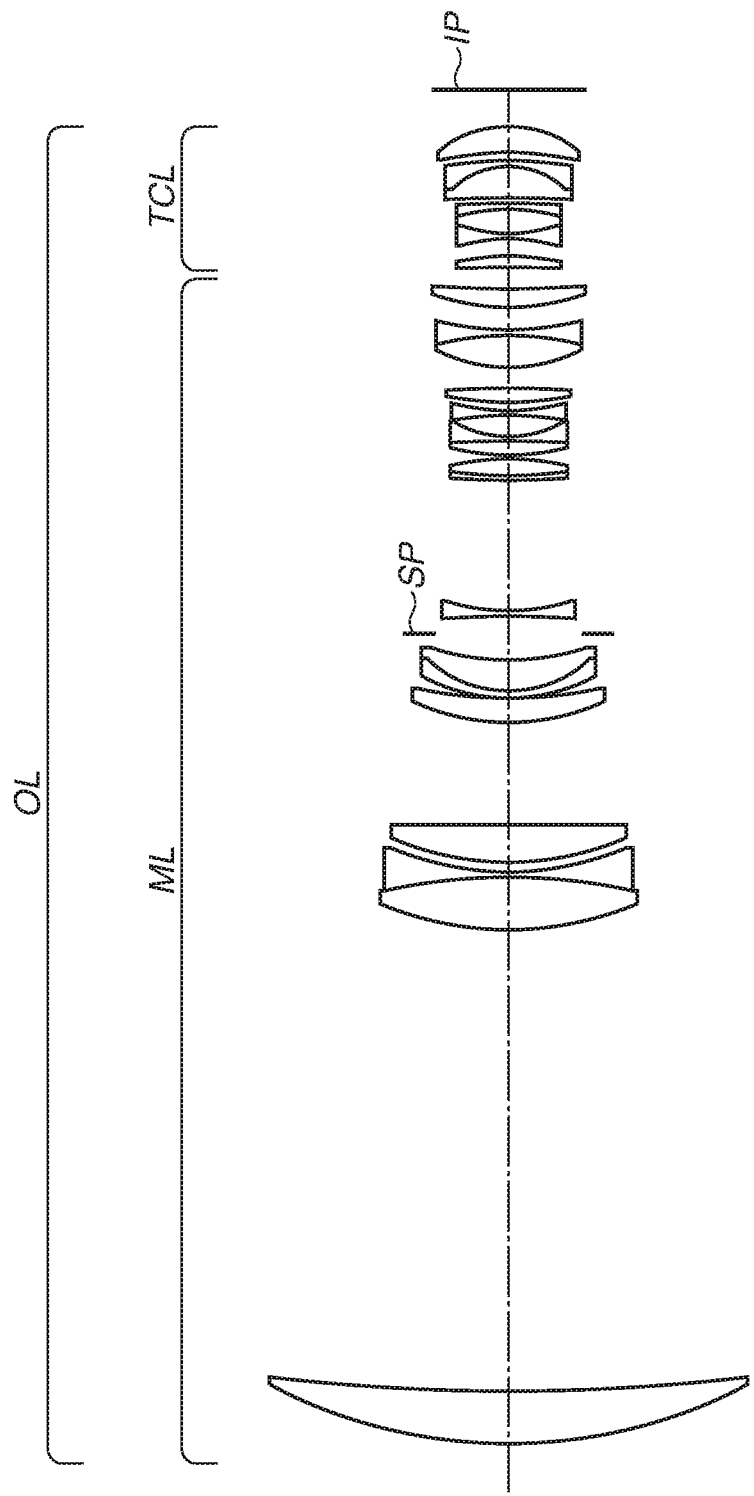
FIG. 1 is a sectional view illustrating a master lens according to an exemplary embodiment and a converter lens according to a first exemplary embodiment.

As illustrated in FIG. 1, a converter lens TCL according to an exemplary embodiment of the present invention is disposed on an image side of a master lens ML, such as an interchangeable lens, so that a focal length of an image capturing optical system OL (entire system) comprising the master lens ML and the converter lens TCL becomes longer than a focal length of an image capturing optical system consisting of only the master lens ML.

The master lens ML is an image capturing lens system for use in an image capturing apparatus, such as a digital video camera, a digital camera, a silver-halide film camera, or a television (TV) camera.

In sectional views of the master lens ML illustrated in FIG. 1 and the converter lens TCL illustrated in FIGS. 2, 4, 6, and 8, the left-hand side is an object side (front), and the right-hand side is the image side (rear). An aperture diaphragm SP determines (limits) a luminous flux in a full aperture f-number (Fno).

In a case where the image capturing apparatus is a digital video camera or a digital camera, an image plane IP corresponds to an image capturing surface of an image sensor (photoelectric conversion element), such as a charge-coupled device (CCD) sensor or a complementary metal oxide semiconductor (CMOS) sensor. In a case where the image capturing apparatus is a silver-halide film camera, the image plane IP corresponds to a film surface.

FIGS. 3, 5, 7, and 9 are aberration diagrams illustrating the converter lens TCL according to respective exemplary embodiments described below. In each spherical aberration diagram, a solid line denotes a d-line, and a dashed-and-double-dotted line denotes a g-line. In each astigmatism diagram, a broken line M denotes an aberration amount on a meridional image plane, and a solid line S denotes an aberration amount on a sagittal image plane. A distortion (%)

diagram (distortion aberration diagram) in each of the aberration diagrams illustrates a distortion aberration amount with respect to a d-line. A chromatic aberration diagram (magnification chromatic aberration diagram) in each of the aberration diagrams illustrates a chromatic aberration amount with respect to a g-line. Further, ω is a half angle of view (degrees) and is an angle of view obtained through paraxial calculation. Fno denotes the f-number.

In a case where a back focal distance of the master lens ML is short, the converter lens TCL is disposed at a position at which the height of a principal ray of off-axis light rays output from the master lens ML is high. At this time, if the positive refractive power of the object side of the converter lens TCL is weak, the diameter of the lens on the image side of the converter lens TCL increases.

Thus, according to an exemplary embodiment of the present invention, the converter lens TCL includes a front group FL having a positive refractive power and a rear group RL disposed on the image side of the front group FL. The front group FL herein is a lens unit having a combined refractive power having a maximum positive refractive power in a case where the combined refractive power is obtained by combining the refractive powers of the lenses in order from the object side to the image side.

Further, the converter lens TCL is configured so that the following Conditional Expression (1) is satisfied:

$$0.10 < f1/(|EXT\_f| \times \beta) < 0.36 \qquad (1).$$

In Conditional Expression (1), f1 is the focal length of the front group FL, EXT_f is the focal length of the converter lens TCL, and β is the lateral magnification of the converter lens TCL when the converter lens TCL is disposed on the image side of the master lens ML.

Conditional Expression (1) expresses a desirable range of a value obtained by normalizing a ratio of the focal length f1 of the front group FL to an absolute value of the focal length EXT_f of the converter lens TCL by the lateral magnification β of the converter lens TCL when the converter lens TCL is disposed on the image side of the master lens ML (hereinafter, the lateral magnification β of the converter lens TCL when the converter lens TCL is disposed on the image side of the master lens ML will be referred to as "the lateral magnification of the converter lens TCL"). A desirable value of the ratio of the focal length f1 of the front group FL to the absolute value of the focal length EXT_f of the converter lens TCL varies depending on the lateral magnification β of the converter lens TCL, so that, in Conditional Expression (1), the normalization is performed to cancel the dependency on the lateral magnification β of the converter lens TCL. The normalization with the lateral magnification β of the converter lens TCL is also conducted in Conditional Expressions (2), (3), and (4) described below for a similar reason.

Conditional Expression (1) indicates that the absolute value of the focal length EXT_f of the converter lens TCL is relatively greater than the focal length f1 of the front group FL. This indicates that the refractive power of the front group FL is increased to bring a principal point closer to the object so that the refractive power of the entire system of the converter lens TCL is decreased compared with the refractive power of the front group FL.

In this way, the positive refractive power is set stronger on the object side than on the image side of the converter lens TCL so that an angle of a principal ray of off-axis light rays incident on the converter lens TCL is brought to be closer to a direction parallel to an optical axis (toward a telecentric direction). This controls an increase in the maximum diameter of the converter lens TCL. The angle of the principal ray of the off-axis light rays is set in this way so that increasing the curvature of a positive lens included in the converter lens TCL is allowed. This makes it easy to reduce a refraction index of a material of the positive lens at the d-line, and to bring the Petzval sum of the converter lens TCL, which tends to have a large negative component, closer to zero by increasing a positive component of the Petzval sum. In this way, field curvature is corrected.

The negative refractive power of the entire system of the converter lens TCL is prevented from becoming excessively strong so that the refractive power of each lens disposed on the image side of the converter lens TCL is prevented from becoming excessively strong. In this way, field curvature, astigmatism, and magnification chromatic aberration are successfully corrected.

If the focal length f1 of the front group FL decreases to an extent that a value of f1/(|EXT_f|×β) falls below a lower limit value of Conditional Expression (1), and the refractive power of the front group FL increases, it becomes difficult to correct on-axis chromatic aberration and coma aberration. Thus, it is not desirable that the value of f1/(|EXT_f|×β) fall below the lower limit value of Conditional Expression (1). If the focal length f1 of the front group FL increases to an extent that a value of f1/(|EXT_f|×β) exceeds the upper limit value of Conditional Expression (1), the refractive power of the front group FL decreases, it becomes difficult to reduce the absolute value of the Petzval sum of the converter lens TCL having a negative focal length. Thus, field curvature and magnification chromatic aberration increase. Thus, it is not desirable that the value of f1/(|EXT_f|×β) exceed the upper limit value of Conditional Expression (1).

As described above, according to an exemplary embodiment of the present invention, the converter lens TCL that is small in size and has high optical performance is obtained. The converter lens TCL according to an exemplary embodiment of the present invention is suitable especially for use in a converter apparatus that is disposed between a mirrorless camera and an interchangeable lens that is attachable to the mirrorless camera and has a relatively short back focal distance.

Desirably, the numerical range of the conditional expression (1) is as follows:

$$0.11 < f1/(|EXT\_f| \times \beta) < 0.34 \qquad (1a).$$

More desirably, the numerical range of Conditional Expression (1) is as follows:

$$0.12 < f1/(|EXT\_f| \times \beta) < 0.32 \qquad (1b).$$

Further, the converter lens TCL desirably includes five or more lenses. In order to be compatible with a lens having a short back focal distance, the converter lens TCL is disposed at a position where the height of the principal ray of the off-axis light rays output from the master lens is relatively high. Thus, in order to successfully correct magnification chromatic aberration and field curvature, the number of lenses is desirably five or more.

Further, the rear group RL of the converter lens TCL according to an exemplary embodiment of the present invention desirably includes a first subgroup A having a positive refractive power and a second subgroup B having a positive refractive power. The second subgroup B herein consists of a cemented lens (first cemented lens) or a single positive lens having a positive refractive power and disposed at a position closest to the image plane in the rear group RL. The cemented lens (or the single positive lens) having a positive refractive power is disposed at the position closest to the image plane in the rear group, that is, a position where the height of on-axis light rays is low, so that field curvature is corrected without increasing other aberration components.

Further, the converter lens TCL desirably satisfies one or more of the following Conditional Expressions (2) to (7):

$$0.03 < fa/(|EXT\_f| \times \beta) < 0.15 \quad (2),$$

$$0.10 < fb/(|EXT\_f| \times \beta) < 0.35 \quad (3),$$

$$1.00 < L/(sk \times \beta) < 4.00 \quad (4),$$

$$0.10 < d/sk < 0.60 \quad (5),$$

$$-0.20 < |EXT\_f| \times \Sigma\{1/Rn \times (1/N'-1/N)\} < 0.20 \quad (6), \text{ and}$$

$$-3.0 < (R2+R1)/(R2-R1) < -0.1 \quad (7).$$

In Conditional Expressions (2) to (7), fa is the focal length of the first subgroup A, and fb is the focal length of the second subgroup B. Further, L is the distance on the optical axis from the lens surface closest to the object to the lens surface closest to the image plane in the converter lens TCL, and sk is the distance on the optical axis from the lens surface closest to the image plane in the converter lens TCL to the image plane when the converter lens TCL is disposed on the image side of the master lens ML. Further, d is the distance on the optical axis from the lens surface closest to the image plane in the front group FL to the lens surface closest to the object in the rear group RL. Rn is the curvature radius of the nth lens surface of the converter lens TCL from the object, N' is the refraction index of a medium on a light exit side of the nth lens surface, and N is the refraction index of the medium on a light incident side of the nth lens surface. Further, R1 is the curvature radius of an object-side surface of the lens closest to the image plane in the converter lens TCL. Further, R2 is the curvature radius of an image-side surface of the lens closest to the image plane in the converter lens TCL.

Conditional Expression (2) expresses a desirable range of a value obtained by normalizing a ratio of the focal length fa of the first subgroup A to an absolute value of the focal length EXT_f of the converter lens TCL by the lateral magnification β of the converter lens TCL. If the focal length fa of the first subgroup A becomes short compared with the absolute value of the focal length EXT_f of the converter lens TCL to an extent that a value of fa/(|EXT_f|×β) falls below the lower limit value of Conditional Expression (2), and the refractive power of the first subgroup A increases, on-axis chromatic aberration, spherical aberration, and coma aberration increase. Thus, it is not desirable that a value of fa/(|EXT_f|×β) fall below the lower limit value. On the other hand, if the absolute value of the focal length EXT_f of the converter lens TCL decreases to an extent that a value of fa/(|EXT_f|×β) exceeds the upper limit value of Conditional Expression (2), the negative component of the Petzval sum increases and field curvature increases. Thus, it is not desirable that a value of fa/(|EXT_f|×β) exceed the upper limit value of Conditional Expression (2).

Conditional Expression (3) expresses a desirable range of a value obtained by normalizing a ratio of the focal length fb of the second subgroup B to the absolute value of the focal length EXT_f of the converter lens TCL by the lateral magnification β of the converter lens TCL. If the focal length fb of the second subgroup B becomes short compared with the absolute value of the focal length EXT_f of the converter lens TCL to an extent that a value of fb/(|EXT_f|×β) falls below the lower limit value of Conditional Expression (3), and the refractive power of the second subgroup B increases, especially magnification chromatic aberration increase. Thus, it is not desirable that the value of fb/(|EXT_f|×β) fall below the lower limit value of Conditional Expression (3). On the other hand, if the focal length fb of the second subgroup B increases to an extent that a value of fb/(|EXT_f|×β) exceeds the upper limit value of Conditional Expression (3), and the refractive power of the second subgroup B decreases, it becomes difficult to correct field curvature. Thus, it is not desirable that the value of fb/(|EXT_f|×β) exceed the upper limit value of Conditional Expression (3).

Conditional Expression (4) expresses a desirable range of a value obtained by normalizing a ratio of the distance L from the lens surface closest to the object to the lens surface closest to the image plane in the converter lens TCL to the distance sk on the optical axis from the lens surface closest to the image plane in the converter lens TCL to the image plane by the lateral magnification β of the converter lens TCL. If the distance L decreases to an extent that a value of L/(sk×β) falls below the lower limit value of Conditional Expression (4), it becomes difficult to increase the thickness of the positive lens due to the space. Thus, it becomes also difficult to increase the curvature of the positive lens. Consequently, field curvature and magnification chromatic aberration increase. Thus, it is not desirable that the value of L/(sk×β) fall below the lower limit value of Conditional Expression. On the other hand, if the distance L increases to an extent that a value of L/(sk×β) exceeds the upper limit value of Conditional Expression (4), the length of the converter lens TCL increases and the size increases. Thus, it is not desirable that the value of L/(sk×β) exceed the upper limit value of Conditional Expression (4).

Conditional Expression (5) defines a ratio of the distance d on the optical axis from the lens surface closest to the image plane in the front group FL to the lens surface closest to the object in the rear group RL to the distance sk on the optical axis from the lens surface closest to the image plane in the converter lens TCL to the image plane when the converter lens TCL is disposed on the image side of the master lens ML. The distance d denotes, in other words, the interval between the front group FL and the rear group RL on the optical axis. If the interval between the front group FL and the rear group RL on the optical axis decreases to an extent that a value of d/sk falls below the lower limit value of Conditional Expression (5), the rear group RL needs to be disposed at a position where the height of the principal ray of the off-axis light rays refracted on the front group FL, causing an increase in diameter of the rear group RL. Thus, it is not desirable that the value of d/sk falls below the lower limit value of Conditional Expression (5). On the other hand, if the interval between the front group FL and the rear group RL on the optical axis increases to an extent that the value of d/sk exceeds the upper limit value of Conditional Expression (5), the negative lens of the rear group RL needs to be disposed at a position where the height of a marginal light ray of on-axis light rays is low. At this time, the refractive power of the negative lens needs to be increased to form an image at a predetermined position, but if the refractive power of the negative lens is increased, the negative component of the Petzval sum increases, and the field curvature increases. Thus, it is not desirable that the value of d/sk exceeds the lower limit value of Conditional Expression (5).

Conditional Expression (6) expresses a desirable range of a value obtained by multiplying the focal length EXT_f of the converter lens TCL by the Petzval sum. If the Petzval sum is increased negatively to an extent that a value of |EXT_f|×Σ{Rn×(1/N'−1/N)} falls below the lower limit value of Conditional Expression (6), the refraction index of the material of the positive lens decreases and the Abbe number increases, whereas the refraction index of the material of the negative lens increases and the Abbe number decreases. Consequently, on-axis chromatic aberration and magnification chromatic aberration increase. Thus, it is not desirable that the value of $|EXT\_f| \times \Sigma\{1/Rn \times (1/N'-1/N)\}$ falls below the lower limit value of the Conditional Expression (6). On the other hand, if the value of $|EXT\_f| \times \Sigma\{1/Rn \times (1/N'-1/N)\}$ exceeds the upper limit value of Conditional Expression (6), the field curvature increases. Thus, it is not desirable that the value of $|EXT\_f| \times \Sigma\{1/Rn \times (1/N'-1/N)\}$ exceeds the upper limit value of Conditional Expression (6).

Conditional Expression (7) expresses a desirable range of a shape factor of the lens closest to the image plane in the converter lens TCL. If an absolute value of the curvature of the lens of the image-side surface decreases to an extent that a value of $(R2+R1)/(R2-R1)$ falls below a lower limit value of Conditional Expression (7), astigmatism increases. Thus, it is not desirable that the value of $(R2+R1)/(R2-R1)$ falls below the lower limit value of Conditional Expression (7). On the other hand, if an absolute value of the curvature of the lens of the image-side surface increases to an extent that the value of $(R2+R1)/(R2-R1)$ exceeds the upper limit value of Conditional Expression (7), the lens size needs to be increased to maintain an edge thickness. Thus, it is not desirable that the value of $(R2+R1)/(R2-R1)$ exceeds the upper limit value of Conditional Expression (7).

The numerical ranges of Conditional Expressions (2) to (7) are desirably as follows:

$$0.04 < fa/(|EXT\_f| \times \beta) < 0.12 \quad (2a),$$

$$0.11 < fb/(|EXT\_f| \times \beta) < 0.32 \quad (3a),$$

$$1.20 < L/(sk \times \beta) < 3.50 \quad (4a),$$

$$0.11 < d/sk < 0.50 \quad (5a),$$

$$-0.18 < |EXT\_f| \times \Sigma\{1/Rn \times (1/N'-1/N)\} < 0.15 \quad (6a), \text{ and}$$

$$-2.5 < (R2+R1)/(R2-R1) < -0.15 \quad (7a).$$

The numerical ranges of Conditional Expressions (2) to (7) are more desirably as follows:

$$0.05 < fa/(|EXT\_f| \times \beta) < 0.10 \quad (2b),$$

$$0.12 < fb/(|EXT\_f| \times \beta) < 0.30 \quad (3b),$$

$$1.50 < L/(sk \times \beta) < 3.10 \quad (4b),$$

$$0.13 < d/sk < 0.47 \quad (5b),$$

$$-0.16 < |EXT\_f| \times \Sigma\{1/Rn \times (1/N'-1/N)\} < 0.10 \quad (6b), \text{ and}$$

$$-2.1 < (R2+R1)/(R2-R1) < -0.2 \quad (7b).$$

Satisfying at least one of the above-described conditional expressions makes it possible to reduce the size of the converter lens TCL and realize high optical performance by suitably correcting various aberration, such as field curvature and astigmatism.

It is desirable that the first subgroup A include a cemented lens (second cemented lens). Instead of a large number of single lenses, the cemented lens is provided in the first subgroup A to thereby decrease a boundary surface with the air so that unnecessary light which generates due to reflection on the boundary surfaces is reduced.

Further, it is desirable that a refraction index of at least one negative lens of the cemented lens included in the first subgroup A be 1.80 or higher. It is desirable that the refraction index of the at least one negative lens be 1.85 or higher, more desirably, 1.90 or higher. Use of a negative lens having a high refraction index in the first subgroup A controls an increase in the curvature of the negative lens included in the first subgroup A. This makes it easy to correct field curvature without increase of other aberration components.

It is desirable that the front group FL consist of two or less lenses. The number of lenses of the front group FL including a lens that has a high refractive power and tends to have a large curvature is decreased to thereby decrease a boundary surface between the lenses and the air so that generation of unnecessary light is controlled.

It is desirable that the number of lenses of the rear group RL be greater than the number of lenses of the front group FL. Reducing the refractive power of the lens disposed at a position at which the height of the principal ray of the off-axis light rays are high makes it easy to suitably correct the field curvature and astigmatism.

Next, the master lens ML according to an exemplary embodiment and the converter lenses TCL according to an exemplary embodiment will be described below.

[Master Lens]

In the present specification, the configuration of the master lens ML is common to the first to fourth exemplary embodiments of the converter lens TCL.

FIG. 1 is a sectional view illustrating the master lens ML of when an infinite-distance object is in focus. The master lens ML has an f-number of 2.90, a half angle of view of 3.16 degrees, and a back focal distance of 39 mm. The master lens ML described as an example is a mere example and may be any other optical systems capable of forming an image on an image plane.

[Converter Lens]

Next, the converter lenses TCL according to the first to fourth exemplary embodiments will be described below.

Figure 2:
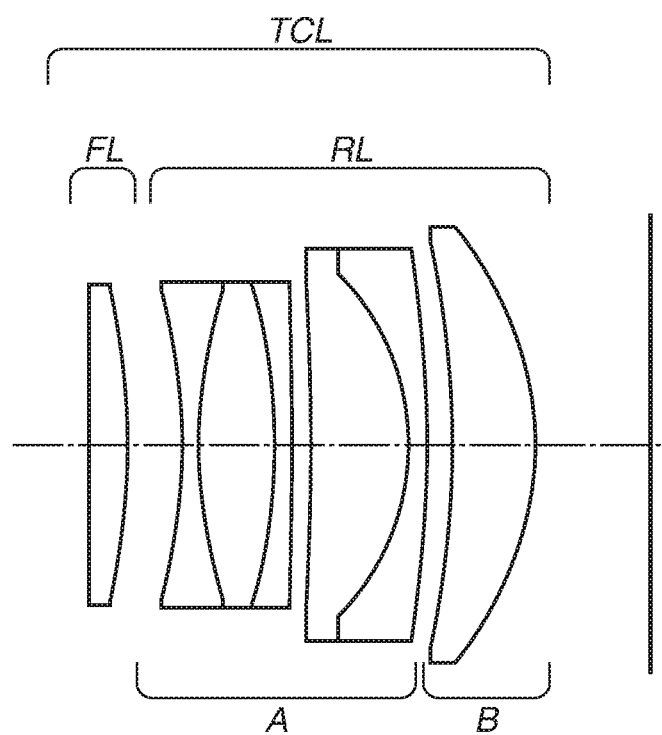
FIG. 2 is a sectional view illustrating the converter lens according to the first exemplary embodiment.
Figure 3:
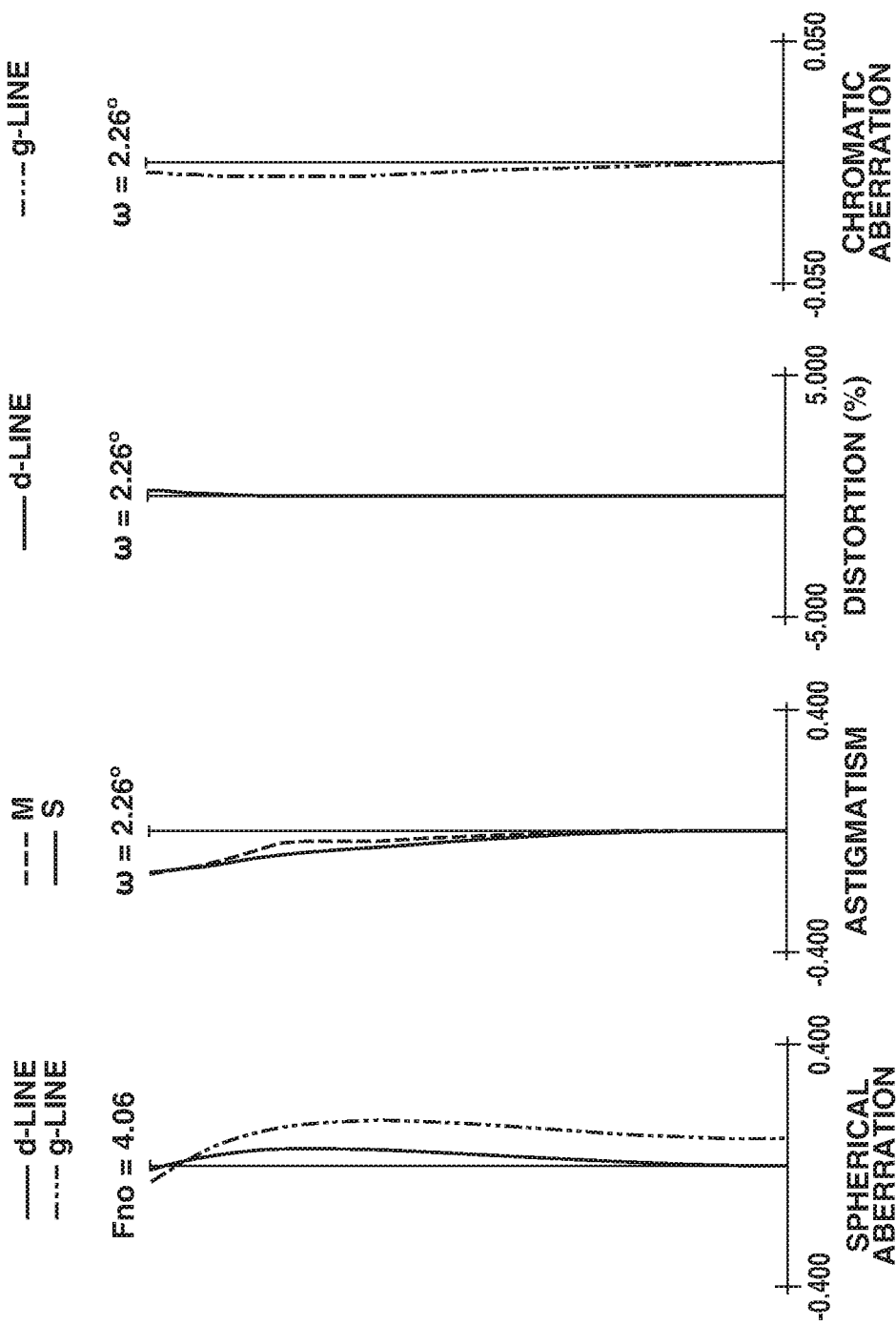
FIG. 3 is an aberration diagram of when an infinite-distance object is in focus in a case where the converter lens according to the first exemplary embodiment is disposed on an image side of the master lens.

A first exemplary embodiment of the present invention will be described below. FIG. 2 is a sectional view illustrating the converter lens TCL according to the first exemplary embodiment. FIG. 3 is an aberration diagram of when an infinite-distance object is in focus in a case where the converter lens TCL according to the first exemplary embodiment is disposed on the image side of the master lens ML. At this time, the lateral magnification is 1.400.

In the converter lens TCL according to the first exemplary embodiment, the front group FL consists of a positive lens disposed closest to the object in the converter lens TCL. Further, the rear group RL consists of six lenses disposed on the image side of the front group FL. In the rear group RL, the first subgroup A consists of a cemented lens (second cemented lens) formed by cementing three lenses that are a negative lens, a positive lens, and a negative lens together and a cemented lens (second cemented lens) disposed on the image side of the cemented lens and formed by cementing a positive lens and a negative lens together. The second subgroup B consists of a single positive lens.

Satisfying the above-described Conditional Expressions (1) to (7) realizes the converter lens TCL with small size and high optical performance. The cemented lenses of the first subgroup A reduce unnecessary light which generates due to the surface reflection, while correcting fluctuations of on-axis chromatic aberration and coma aberration for each wavelength. The second subgroup B corrects the field curvature.

Figure 4:
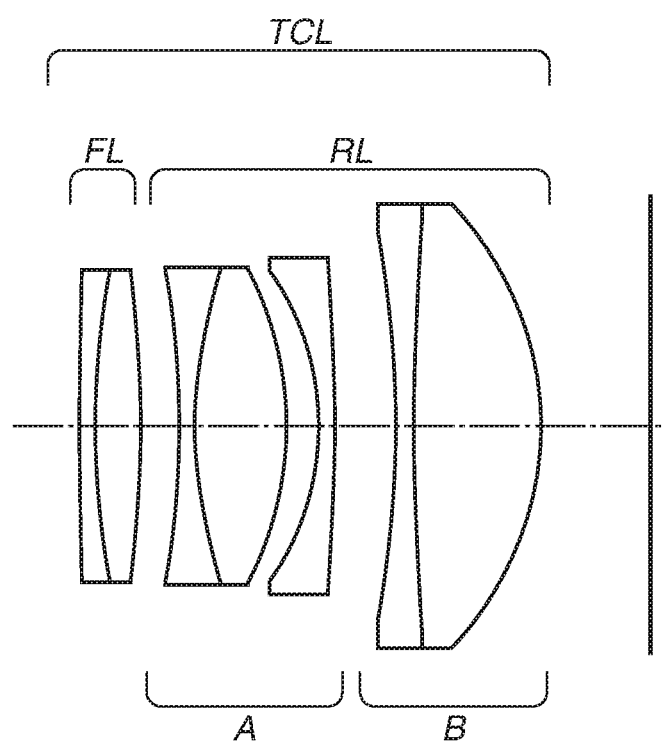
FIG. 4 is a sectional view illustrating a converter lens according to a second exemplary embodiment.
Figure 5:
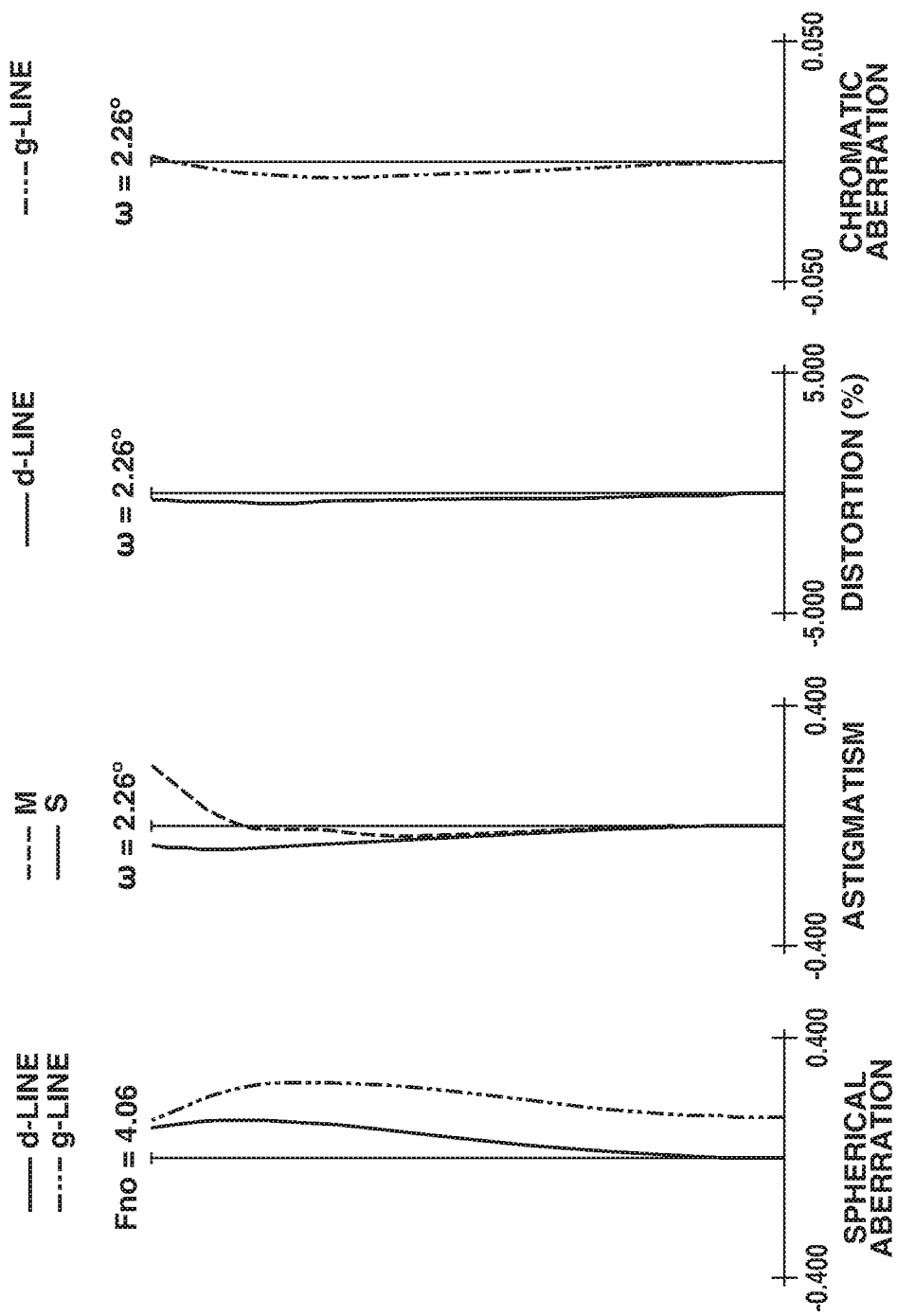
FIG. 5 is an aberration diagram of when the infinite-distance object is in focus in a case where the converter lens according to the second exemplary embodiment is disposed on the image side of the master lens.

A second exemplary embodiment of the present invention will be described below. FIG. 4 is a sectional view illustrating the converter lens TCL according to the present exemplary embodiment. FIG. 5 is an aberration diagram of when an infinite-distance object is in focus in a case where the converter lens TCL according to the second exemplary embodiment is disposed on the image side of the master lens ML. At this time, the lateral magnification is 1.400.

In the converter lens TCL according to the second exemplary embodiment, the front group FL consists of a cemented lens disposed closest to the object in the converter lens TCL. The cemented lens consists of a negative lens and a positive lens that is disposed on the image side of this negative lens and is adjacent to the negative lens. Further, the rear group RL consists of five lenses disposed closer to the image than the front group FL is.

In the rear group RL, the first subgroup A consists of a cemented lens (second cemented lens) disposed closest to the object in the rear group RL and a negative lens that is disposed on the image side of the cemented lens and is adjacent to the cemented lens. The second subgroup B consists of a cemented lens (first cemented lens) formed by cementing a negative lens and a positive lens together.

Satisfying the above-described Conditional Expressions (1) to (7) realizes the converter lens TCL with small size and high optical performance. The cemented lens in the first subgroup A reduces unnecessary light which generates due to the surface reflection, while correcting fluctuations of on-axis chromatic aberration and coma aberration for each wavelength. The positive lens of the cemented lens of the second subgroup B corrects the field curvature while the negative lens cemented with the positive lens corrects the magnification chromatic aberration caused by the positive lens.

Figure 6:
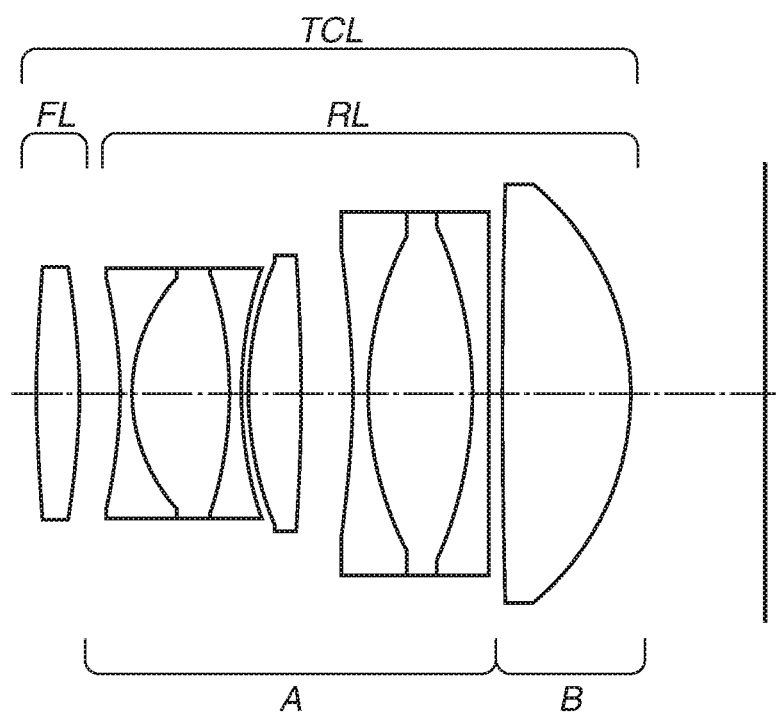
FIG. 6 is a sectional view illustrating a converter lens according to a third exemplary embodiment.
Figure 7:
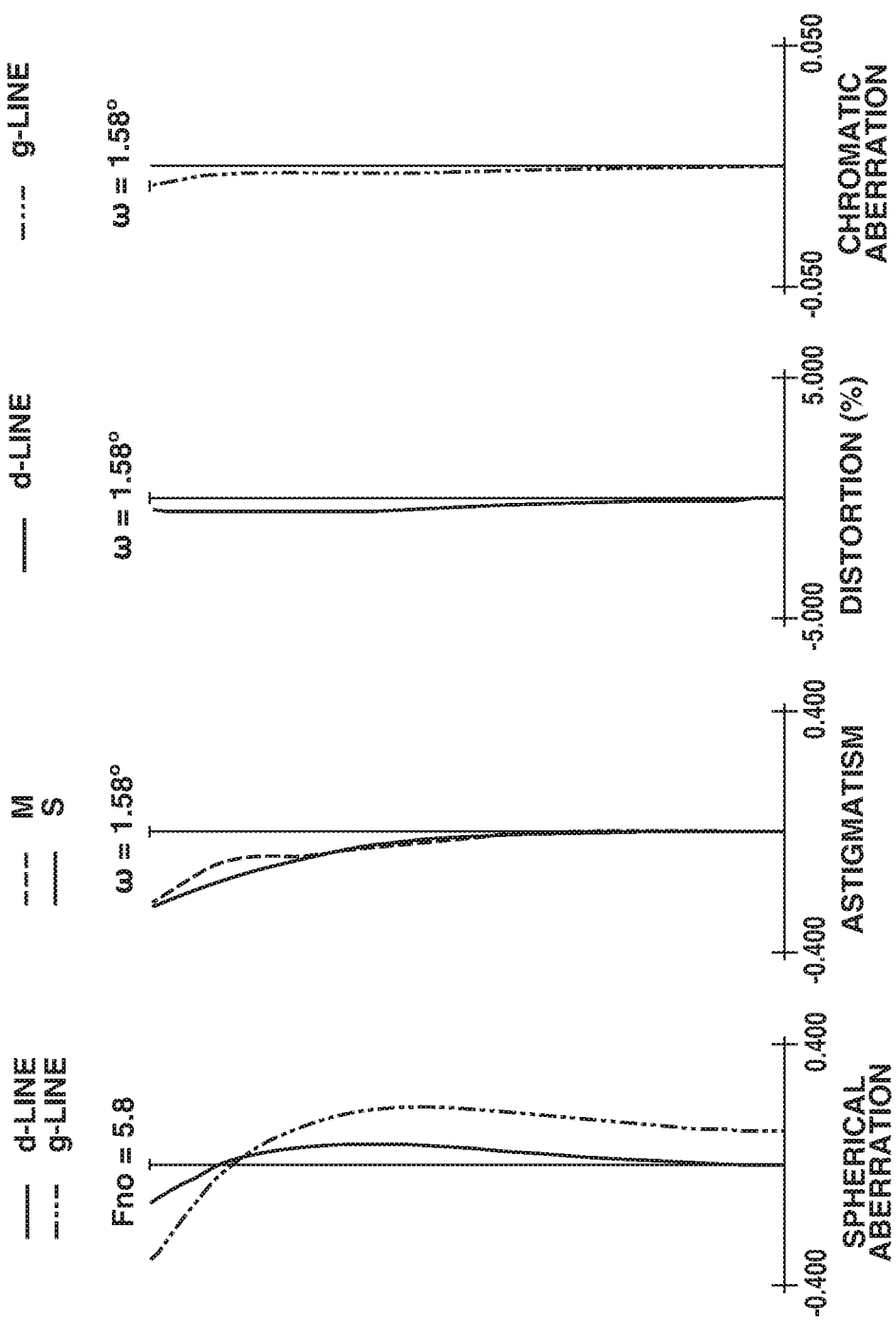
FIG. 7 is an aberration diagram of when the infinite-distance object is in focus in a case where the converter lens according to the third exemplary embodiment is disposed on the image side of the master lens.

A third exemplary embodiment of the present invention will be described below. FIG. 6 is a sectional view illustrating the converter lens TCL according to the third exemplary embodiment. FIG. 7 is an aberration diagram of when an infinite-distance object is in focus in a case where the converter lens TCL according to the present exemplary embodiment is disposed on the image side of the master lens ML. At this time, the lateral magnification is 2.000.

In the converter lens TCL according to the third exemplary embodiment, the front group FL consists of a positive lens disposed closest to the object in the converter lens TCL. The rear group RL consists of eight lenses disposed on the image side of the front group FL.

In the rear group RL, the first subgroup A consists of a cemented lens (second cemented lens) formed by cementing three lenses that are a negative lens, a positive lens, and a negative lens together, a single positive lens, and a cemented lens (second cemented lens) formed by cementing three lenses that are a negative lens, a positive lens, and a negative lens together. The second subgroup B consists of a single positive lens.

Satisfying the above-described conditional expressions (1) to (7) realizes the converter lens TCL with small size and high optical performance.

The cemented lens on the object side of the first subgroup A reduces unnecessary light which generates due to surface reflection while correcting fluctuations of on-axis chromatic aberration and coma aberration for each wavelength. The positive lens between the two cemented lenses of the first subgroup A corrects especially on-axis chromatic aberration. The cemented lens on the image side in the first subgroup A reduces the unnecessary light which generates due to the surface reflection while correcting especially magnification chromatic aberration. The positive lens of the second subgroup B corrects the field curvature.

Figure 8:
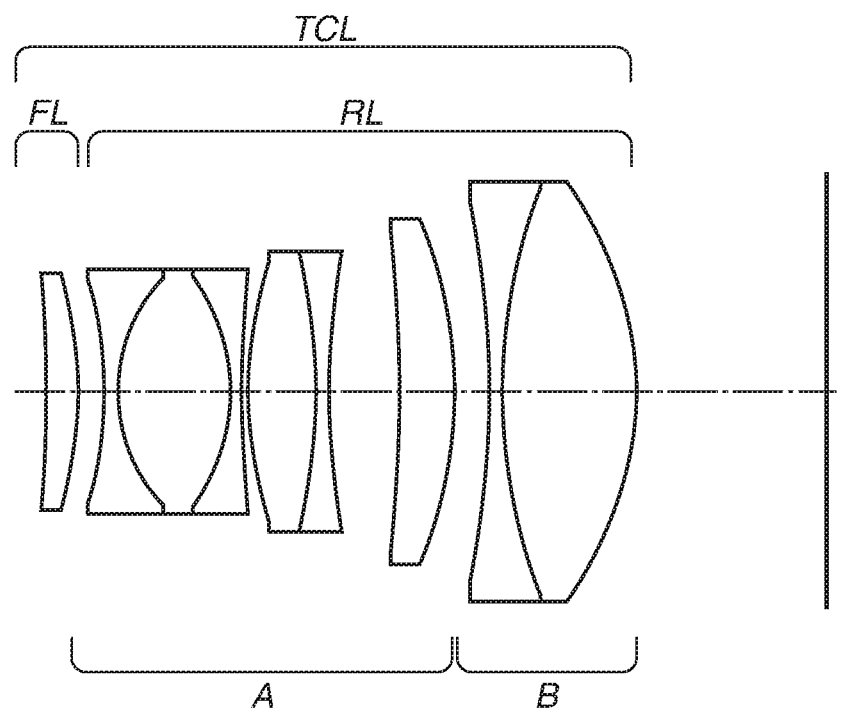
FIG. 8 is a sectional view illustrating a converter lens according to a fourth exemplary embodiment.

A fourth exemplary embodiment of the present invention will be described below. FIG. 8 is a sectional view illustrating the converter lens TCL according to the present exemplary embodiment. FIG. 9 is an aberration diagram of when an infinite-distance object is in focus in a case where the converter lens TCL according to the present exemplary embodiment is disposed on the image side of the master lens ML. At this time, the lateral magnification is 1.998.

In the converter lens TCL according to the fourth exemplary embodiment, the front group FL consists of a positive lens disposed closest to the object in the converter lens TCL. The rear group RL consists of eight lenses disposed on the image side of the front group FL.

In the rear group RL, the first subgroup A consists of a cemented lens (second cemented lens) formed by cementing three lenses that are a negative lens, a positive lens, and a negative lens together, a cemented lens (second cemented lens) formed by cementing a positive lens and a negative lens together, and a single positive lens. The second subgroup B consists of a cemented lens (first cemented lens) formed by cementing a negative lens and a positive lens together.

Satisfying the above-described conditional expressions (1) to (7) realizes the converter lens TCL with small size and high optical performance. The cemented lens on the object side of the first subgroup A reduces unnecessary light which generates due to surface reflection while correcting fluctuations of on-axis chromatic aberration and coma aberration with respect to each wavelength. The cemented lens on the image side in the first subgroup A reduces the unnecessary light which generates due to the surface reflection while correcting especially magnification chromatic aberration. The positive lens that is disposed on the image side of the cemented lens and is adjacent to the cemented lens corrects the field curvature.

The positive lens of the cemented lens in the second subgroup B corrects the field curvature while magnification chromatic aberration caused by the positive lens are corrected by the negative lens cemented with the positive lens.

Numerical Exemplary Embodiments

A numerical exemplary embodiment corresponding to the master lens ML and first to fourth numerical exemplary embodiments corresponding to the converter lens TCL according to the first to fourth exemplary embodiments will be described below.

In each numerical exemplary embodiment, the surface number indicates the order of an optical surface from the object side. Further, r denotes a curvature radius (mm) of each optical surface, d at a surface number i denotes an interval (mm) between the ith optical surface and the (i+1)th optical surface, nd is a refraction index of a material of an optical member at d-line, and vd is an Abbe number of the material of the optical member at d-line as a reference. The Abbe number vd of a material is expressed by the following expression:

$$vd=(Nd-1)/(NF-NC)$$

where Nd, NF, and NC are the refraction indexes of the Fraunhofer d-line (587.56 nm), F-line (486.13 nm), and C-line (656.27 nm), respectively. An effective diameter is a diameter on the lens that is determined by an off-axis light ray passing range.

BF denotes a back focal distance. The back focal distance of the master lens ML in the numerical exemplary embodiments is expressed in an air equivalent length of the distance from the surface closest to the image plane to a paraxial image plane on the optical axis. The back focal distance of the converter lens TCL in the numerical exemplary embodiments expressed in an air equivalent length of the distance on the optical axis from a surface closest to the image plane in the converter lens TCL to the paraxial image plane when the converter lens TCL is disposed on the image side of the master lens ML.

A full lens length of the master lens ML in the numerical exemplary embodiments is the sum of the back focal distance and the distance on the optical axis from the surface (first lens surface) closest to the object to the surface (last lens surface) closest to the image plane in the master lens ML.

A lens interval between the master lens ML and the converter lens TCL is the distance on the optical axis from the surface closest to the image plane in the master lens ML to a surface closest to the object in the converter lens TCL. The interval between the master lens ML and the converter lens TCL is specified by an air equivalent length.

A front principal point position is the distance from the surface closest to the object to a front principal point, and a rear principal point position is the distance from the surface closest to the image plane to a rear principal point. Each numerical value of the front principal point position and the rear principal point position is a paraxial amount, and the direction from the object side to the image side is regarded as positive for the signs.

Table 1 shows physical quantities that are used in the above-described conditional expressions in the first to fourth numerical exemplary embodiments, and Table 2 shows values corresponding to Conditional Expressions.

[Master Lens]—Common to the Converter Lens According to the First to Fourth Numerical Exemplary Embodiments—

Unit: mm

Surface Data

| Surface Number | r | d | nd | vd | Effective Diameter |
|---|---|---|---|---|---|
| 1 | 147.291 | 15.31 | 1.59522 | 67.7 | 135.17 |
| 2 | 497.553 | 135.95 | | | 133.90 |
| 3 | 93.917 | 15.46 | 1.43700 | 95.1 | 73.31 |
| 4 | −169.659 | 1.50 | 1.80610 | 33.3 | 70.94 |
| 5 | 85.058 | 2.78 | | | 66.85 |
| 6 | 81.980 | 11.17 | 1.43700 | 95.1 | 67.06 |
| 7 | ∞ | 30.12 | | | 66.17 |
| 8 | 64.700 | 7.23 | 1.89286 | 20.4 | 54.51 |
| 9 | 117.746 | 0.20 | | | 52.05 |
| 10 | 53.244 | 2.00 | 1.83400 | 37.2 | 49.56 |
| 11 | 34.348 | 8.98 | 1.43700 | 95.1 | 45.88 |
| 12 | 71.295 | 7.95 | | | 43.85 |
| 13 (Diaphragm) | ∞ | 5.00 | | | 41.52 |
| 14 | −424.241 | 1.60 | 1.61800 | 63.4 | 36.89 |
| 15 | 56.377 | 38.46 | | | 35.12 |
| 16 | 192.506 | 1.40 | 1.89286 | 20.4 | 32.02 |
| 17 | 120.766 | 4.96 | 1.51742 | 52.4 | 32.17 |
| 18 | −71.885 | 1.00 | | | 32.51 |
| 19 | 61.529 | 4.26 | 1.80610 | 33.3 | 32.60 |
| 20 | −244.681 | 1.20 | 1.53775 | 74.7 | 32.24 |
| 21 | 29.916 | 6.46 | | | 30.47 |
| 22 | −88.814 | 1.20 | 1.72916 | 54.7 | 30.63 |
| 23 | 62.251 | 2.54 | | | 31.75 |
| 24 | 94.888 | 4.00 | 1.65412 | 39.7 | 33.60 |
| 25 | −343.957 | 6.25 | | | 34.34 |
| 26 | 45.503 | 9.29 | 1.64769 | 33.8 | 40.49 |

-continued

Unit: mm

| | | | | | |
|---|---|---|---|---|---|
| 27 | −81.900 | 1.70 | 1.80810 | 22.8 | 40.30 |
| 28 | 81.305 | 6.55 | | | 40.02 |
| 29 | 64.484 | 5.47 | 1.56732 | 42.8 | 42.70 |
| 30 | 294.428 | 39.00 | | | 42.59 |
| Image Plane | ∞ | | | | |

Various Types of Data

| | |
|---|---|
| Zoom Ratio | 1.00 |
| Focal Length | 392.00 |
| F-Number | 2.90 |
| Half Angle of View (degrees) | 3.16 *Paraxial Ray Tracing Value |
| Image Height | 21.64 |
| Full Lens Length | 379.01 |
| BF | 39.00 |
| Incident Pupil Position | 655.94 |
| Exit Pupil Position | −130.05 |
| Front Principal Point Position | 138.96 |
| Rear Principal Point Position | −353.00 |

Single Lens Data

| Lens | Starting Surface | Focal Length |
|---|---|---|
| 1 | 1 | 345.87 |
| 2 | 3 | 140.85 |
| 3 | 5 | −70.10 |
| 4 | 6 | 187.60 |
| 5 | 8 | 151.14 |
| 6 | 10 | −121.91 |
| 7 | 11 | 141.23 |
| 8 | 14 | −80.42 |
| 9 | 16 | −366.32 |
| 10 | 17 | 87.86 |
| 11 | 19 | 61.37 |
| 12 | 20 | −49.50 |
| 13 | 22 | −50.03 |
| 14 | 24 | 114.11 |
| 15 | 26 | 46.50 |
| 16 | 27 | −50.26 |
| 17 | 29 | 144.30 |

[Converter Lens]
[First Numerical Exemplary Embodiment]
Unit: mm
Surface Data

| Surface Number | r | d | nd | vd | Effective Diameter |
|---|---|---|---|---|---|
| 1 | ∞ | 3.59 | 1.85478 | 24.8 | 28.54 |
| 2 | −69.633 | 5.16 | | | 28.62 |
| 3 | −52.206 | 1.50 | 1.77250 | 49.6 | 27.19 |
| 4 | 45.801 | 7.17 | 1.59270 | 35.3 | 27.58 |
| 5 | −50.952 | 1.50 | 2.05090 | 26.9 | 28.06 |
| 6 | −944.570 | 1.76 | | | 28.89 |
| 7 | −294.724 | 9.34 | 1.51823 | 58.9 | 29.61 |
| 8 | −22.495 | 1.60 | 1.95375 | 32.3 | 30.86 |
| 9 | −117.544 | 2.43 | | | 35.02 |
| 10 | −91.468 | 7.75 | 1.68893 | 31.1 | 36.93 |
| 11 | −30.784 | | | | 38.96 |

Various Types of Data

| | |
|---|---|
| Focal Length | −184.66 |
| Front Principal Point Position | −19.75 |
| Rear Principal Point Position | −62.84 |
| Lateral Magnification | 1.400 |

Single Lens Data

| Lens | Starting Surface | Focal Length |
|---|---|---|
| 1 | 1 | 81.46 |
| 2 | 3 | −31.37 |
| 3 | 4 | 41.85 |
| 4 | 5 | −51.29 |

-continued

| Unit: mm | | |
|---|---|---|
| 5 | 7 | 46.45 |
| 6 | 8 | −29.41 |
| 7 | 10 | 64.02 |

An interval between the master lens and the converter lens according to the first numerical exemplary embodiment: 6.00

Second Numerical Exemplary Embodiment

| Unit: mm | | | | | |
|---|---|---|---|---|---|
| Surface Data | | | | | |
| Surface Number | r | d | nd | vd | Effective Diameter |
| 1 | 364.337 | 1.50 | 1.90043 | 37.4 | 27.74 |
| 2 | 75.135 | 4.30 | 1.85478 | 24.8 | 27.78 |
| 3 | −108.452 | 3.59 | | | 27.84 |
| 4 | −81.339 | 1.50 | 1.90043 | 37.4 | 27.26 |
| 5 | 45.855 | 8.57 | 1.62004 | 36.3 | 27.59 |
| 6 | −31.329 | 3.00 | | | 28.19 |
| 7 | −24.851 | 1.50 | 2.05090 | 26.9 | 27.49 |
| 8 | −202.363 | 5.73 | | | 30.08 |
| 9 | −99.050 | 1.70 | 1.90043 | 37.4 | 34.57 |
| 10 | 252.137 | 11.91 | 1.67300 | 38.3 | 37.10 |
| 11 | −29.905 | | | | 39.89 |

| Various Types of Data | |
|---|---|
| Focal Length | −379.68 |
| Front Principal Point Position | −75.48 |
| Rear Principal Point Position | −141.87 |
| Lateral Magnification | 1.400 |

| Single Lens Data | | |
|---|---|---|
| Lens | Starting Surface | Focal Length |
| 1 | 1 | −105.38 |
| 2 | 2 | 52.49 |
| 3 | 4 | −32.39 |
| 4 | 5 | 31.35 |
| 5 | 7 | −27.08 |
| 6 | 9 | −78.80 |
| 7 | 10 | 40.41 |

An interval between the master lens and the converter lens according to the second numerical exemplary embodiment: 6.00

Third Numerical Exemplary Embodiment

| Unit: mm | | | | | |
|---|---|---|---|---|---|
| Surface Data | | | | | |
| Surface Number | r | d | nd | vd | Effective Diameter |
| 1 | 129.729 | 4.11 | 1.80518 | 25.5 | 23.16 |
| 2 | −70.855 | 3.87 | | | 22.88 |
| 3 | −50.389 | 1.20 | 1.90043 | 37.4 | 21.15 |
| 4 | 16.267 | 9.39 | 1.66565 | 35.6 | 20.95 |
| 5 | −37.744 | 1.20 | 1.88300 | 40.8 | 21.79 |
| 6 | 37.362 | 0.62 | | | 22.96 |
| 7 | 33.200 | 5.13 | 1.72047 | 34.7 | 24.64 |
| 8 | −186.032 | 4.97 | | | 25.25 |
| 9 | −80.738 | 1.50 | 1.90043 | 37.4 | 26.76 |
| 10 | 32.305 | 10.07 | 1.67300 | 38.3 | 28.82 |
| 11 | −40.348 | 1.60 | 2.05090 | 26.9 | 30.86 |
| 12 | ∞ | 1.32 | | | 33.70 |
| 13 | 536.519 | 12.33 | 1.54814 | 45.8 | 36.13 |
| 14 | −26.517 | | | | 38.95 |

| Various Types of Data | |
|---|---|
| Focal Length | −111.67 |
| Front Principal Point Position | −22.84 |
| Rear Principal Point Position | −98.58 |
| Lateral Magnification | 2.000 |

| Single Lens Data | | |
|---|---|---|
| Lens | Starting Surface | Focal Length |
| 1 | 1 | 57.44 |
| 2 | 3 | −13.54 |
| 3 | 4 | 18.35 |
| 4 | 5 | −21.11 |
| 5 | 7 | 39.49 |
| 6 | 9 | −25.46 |
| 7 | 10 | 28.23 |
| 8 | 11 | −38.39 |
| 9 | 13 | 46.46 |

An interval between the master lens and the converter lens according to the third numerical exemplary embodiment: 6.00

Fourth Numerical Exemplary Embodiment

| Unit: mm | | | | | |
|---|---|---|---|---|---|
| Surface Data | | | | | |
| Surface Number | r | d | nd | vd | Effective Diameter |
| 1 | −178.894 | 3.17 | 1.85478 | 24.8 | 22.37 |
| 2 | −38.477 | 2.62 | | | 22.46 |
| 3 | −37.475 | 1.20 | 1.72916 | 54.7 | 21.18 |
| 4 | 16.000 | 11.24 | 1.64769 | 33.8 | 21.15 |
| 5 | −19.159 | 1.20 | 2.05090 | 26.9 | 21.48 |
| 6 | 145.017 | 0.50 | | | 23.08 |
| 7 | 40.045 | 6.79 | 1.59551 | 39.2 | 24.93 |
| 8 | −61.657 | 1.30 | 1.84666 | 23.8 | 25.78 |
| 9 | 78.421 | 7.00 | | | 26.81 |
| 10 | −140.740 | 5.46 | 1.65412 | 39.7 | 31.23 |
| 11 | −45.342 | 3.50 | | | 33.16 |
| 12 | −90.306 | 1.30 | 1.59282 | 68.6 | 35.57 |
| 13 | 55.686 | 13.17 | 1.51742 | 52.4 | 38.57 |
| 14 | −34.900 | | | | 40.32 |

| Various Types of Data | |
|---|---|
| Focal Length | −212.13 |
| Front Principal Point Position | −72.96 |
| Rear Principal Point Position | −192.79 |
| Lateral Magnification | 1.998 |

| Single Lens Data | | |
|---|---|---|
| Lens | Starting Surface | Focal Length |
| 1 | 1 | 56.76 |
| 2 | 3 | −15.23 |
| 3 | 4 | 15.40 |
| 4 | 5 | −16.04 |
| 5 | 7 | 41.81 |

-continued

| Unit: mm | | |
|---|---|---|
| 6 | 8 | −40.60 |
| 7 | 10 | 100.00 |
| 8 | 12 | −57.91 |
| 9 | 13 | 43.63 |

An interval between the master lens and the converter lens according to the fourth numerical exemplary embodiment: 6.00

TABLE 1

| | First Numerical Exemplary Embodiment | Second Numerical Exemplary Embodiment | Third Numerical Exemplary Embodiment | Fourth Numerical Exemplary Embodiment |
|---|---|---|---|---|
| f1 | 81.463 | 103.122 | 57.438 | 56.757 |
| \|EXT_f\| | 184.658 | 379.683 | 111.674 | 212.135 |
| β | 1.400 | 1.400 | 2.000 | 1.998 |
| fa | −22.611 | −28.082 | −12.092 | −25.305 |
| fb | 64.015 | 69.980 | 46.457 | 125.016 |
| sk | 11.000 | 10.000 | 13.096 | 18.925 |
| d | 5.160 | 3.590 | 3.870 | 2.620 |
| L | 41.792 | 43.295 | 57.313 | 58.450 |
| Σ(1/N' − 1/N) × 1/Rm | −0.000072 | 0.000080 | −0.000552 | −0.000693 |

TABLE 2

| | First Numerical Exemplary Embodiment | Second Numerical Exemplary Embodiment | Third Numerical Exemplary Embodiment | Fourth Numerical Exemplary Embodiment |
|---|---|---|---|---|
| Conditional Expression (1) | 0.315 | 0.194 | 0.257 | 0.134 |
| Conditional Expression (2) | 0.087 | 0.053 | 0.054 | 0.060 |
| Conditional Expression (3) | 0.248 | 0.132 | 0.208 | 0.295 |
| Conditional Expression (4) | 2.714 | 3.092 | 2.188 | 1.546 |
| Conditional Expression (5) | 0.469 | 0.359 | 0.296 | 0.138 |
| Conditional Expression (6) | −0.013 | 0.030 | −0.062 | −0.147 |
| Conditional Expression (7) | −2.015 | −0.788 | −0.906 | −0.229 |

[Image Capturing Apparatus According to Exemplary Embodiments]

Figure 10A:
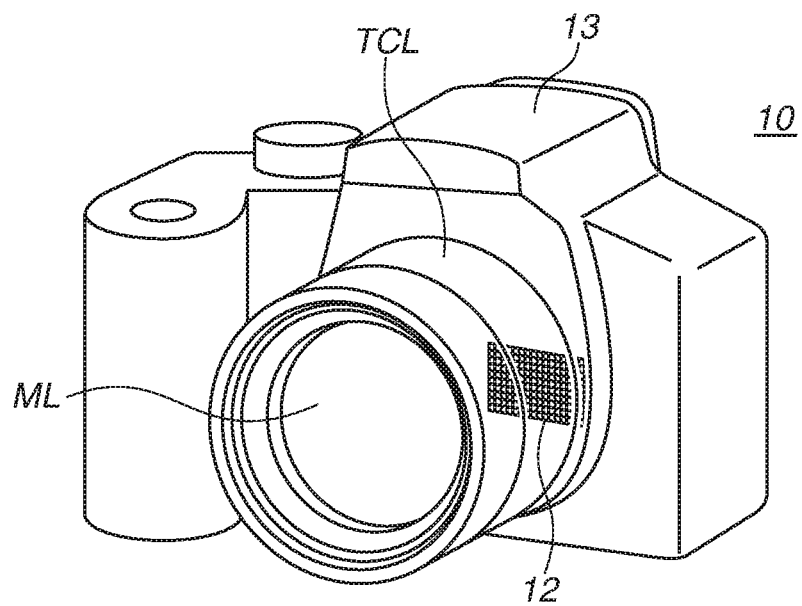
FIGS. 10A and 10B each illustrate a configuration of an image capturing system.
Figure 10B:
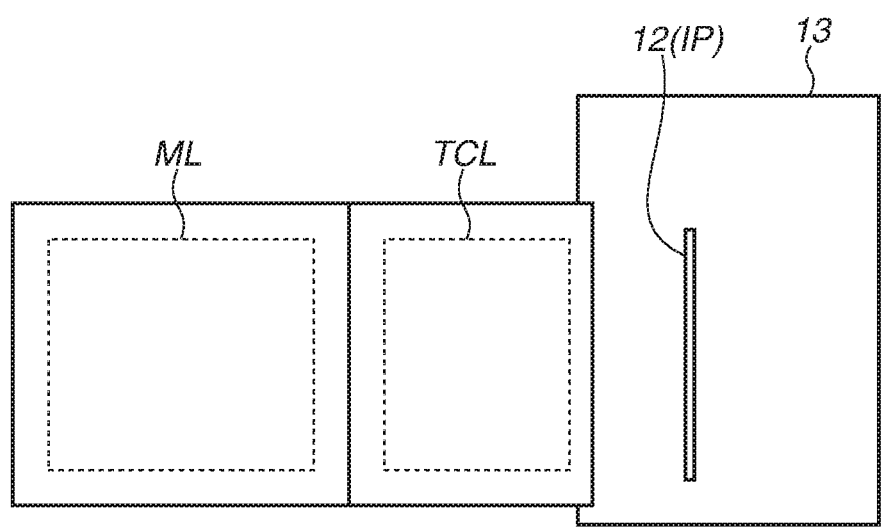

FIGS. 10A and 10B each illustrate a configuration of an image capturing apparatus (digital camera) 10. FIG. 10A is a perspective view, and FIG. 10B is a side view. The image capturing apparatus 10 includes a camera main body 13, the master lens ML, the converter lens TCL according to any one of the above-described first to fourth exemplary embodiments, and a light receiving element (image sensor) 12 configured to photoelectrically convert an image formed by the master lens ML and the converter lens TCL. An image sensor, such as a CCD sensor and a CMOS sensor, can be used as the light receiving element 12. The master lens ML and the converter lens TCL can be integrated with the camera main body 13 or can each be arranged to be attachable to and detachable from the camera main body 13. In the case where the master lens ML and the converter lens TCL are integrated with the camera main body 13, the converter lens TCL is insertably and removably arranged on an optical axis.

[Interchangeable Lens According to Exemplary Embodiment]

The present invention is applicable to an interchangeable lens that includes the master lens ML and the converter lens TCL in the same barrel and is attachable to and detachable from an image capturing apparatus. The master lens ML can be a fixed focal length lens or a zoom lens. In such a case, the converter lens TCL is insertably and removably arranged on an optical axis. The converter lens TCL is disposed on or off the optical axis based on a user instruction via an operation member or a user interface.

While various exemplary embodiments of the present invention have been described, the present invention is not limited to the exemplary embodiments and examples, and various combinations, modifications, and changes are possible within the spirit of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-034283, filed Feb. 27, 2019, and No. 2019-210887, filed Nov. 21, 2019, which are hereby incorporated by reference herein in their entirety.

What is claimed is:

1. A converter lens that has a negative refractive power as a whole and is disposed on an image side of a master lens so that a focal length of an entire system becomes longer than a focal length of the master lens alone,
    wherein the converter lens consists of a front unit having a positive refractive power and a rear unit having a negative refractive power,
    wherein the front unit has a combined refractive power having a maximum positive refractive power in a case where the combined refractive power is obtained by a refractive power of each lens being combined in order from the lens closest to an object to the image side, and
    wherein the following conditional expressions are satisfied:

$$0.11 < f1/(|EXT\_f| \times \beta) \leq 0.257$$

$$1.00 < L/(sk \times \beta) < 4.00$$

where f1 is a focal length of the front unit, EXT_f is a focal length of the converter lens, β is a lateral magnification of the converter lens when the converter lens is disposed on an image side of the master lens, L is a distance on an optical axis from a lens surface closest to the object in the converter lens to a lens surface closest to the image plane in the converter lens, and sk is a distance on the optical axis from a lens surface closest to the image plane in the converter lens to the image plane when the converter lens is disposed on an image side of the master lens.

2. The converter lens according to claim 1,
    wherein the rear unit includes a first subunit and a second subunit, and
    wherein the second subunit consists of a first cemented lens closest to an image plane in the rear unit or a positive lens closest to the image plane in the rear unit, the first cemented lens including a positive lens and a negative lens and having a positive refractive power as a whole.

3. The converter lens according to claim 2, wherein the following conditional expression is satisfied:

$$0.03 < fa/(|EXT\_f| \times \beta) < 0.15$$

where fa is a focal length of the first subunit.

4. The converter lens according to claim 2, wherein the first subunit includes a second cemented lens including a positive lens and a negative lens.

5. The converter lens according to claim 4, wherein at least one negative lens of the second cemented lens has a refraction index of 1.80 or higher with respect to a d-line.

6. The converter lens according to claim 2, wherein the following conditional expression is satisfied:

$$0.10 < fb/(|EXT\_f| \times \beta) < 0.35$$

where fb is a focal length of the second subunit.

7. The converter lens according to claim 1, wherein the following conditional expression is satisfied:

$$0.10 < d/sk < 0.60$$

where d is a distance on an optical axis from a lens surface closest to the image plane in the front unit to a lens surface closest to the object in the rear unit, and sk is a distance on the optical axis from a lens surface closest to the image plane in the converter lens to the image plane when the converter lens is disposed on an image side of the master lens.

8. The converter lens according to claim 1, wherein the following conditional expression is satisfied:

$$-0.20 < |EXT\_f| \times \Sigma\{(1/N'-1/N)/Rn\} < 0.20$$

where Rn is a curvature radius of an n-th lens surface of the converter lens from the object, N' is a refraction index of a medium on a light exit side of the n-th lens surface, and N is a refraction index of a medium on a light incident side of the n-th lens surface.

9. The converter lens according to claim 1, wherein the following conditional expression is satisfied:

$$-3.0 < (R2+R1)/(R2-R1) < -0.1$$

where R1 is a curvature radius of an object-side surface of a lens closest to the image plane in the converter lens, and R2 is a curvature radius of an image-side surface of the lens closest to the image plane in the converter lens.

10. The converter lens according to claim 1, wherein the front unit consists of two or less lenses.

11. The converter lens according to claim 1, wherein the number of lenses of the rear unit is greater than the number of lenses of the front unit.

12. The converter lens according to claim 1, wherein the converter lens comprising five or more lens elements.

13. An interchangeable lens including a master lens and a converter lens that has a negative refractive power as a whole and is disposed in an optical path so that a focal length of an entire system becomes longer than a focal length of the master lens alone, wherein the converter lens consists of a front unit having a positive refractive power and a rear unit having a negative refractive power, wherein the front unit has a combined refractive power having a maximum positive refractive power in a case where the combined refractive power is obtained by a refractive power of each lens being combined in order from the lens closest to an object to an image side, and wherein the following conditional expressions are satisfied:

$$0.11 < f1/(|EXT\_f| \times \beta) \leq 0.257$$

$$1.00 < L/(sk \times \beta) < 4.00$$

where f1 is a focal length of the front unit, EXT_f is a focal length of the converter lens, β is a lateral magnification of the converter lens when the converter lens is disposed on an image side of the master lens, L is a distance on an optical axis from a lens surface closest to the object in the converter lens to a lens surface closest to the image plane in the converter lens, and sk is a distance on the optical axis from a lens surface closest to the image plane in the converter lens to the image plane when the converter lens is disposed on an image side of the master lens.

14. An image capturing apparatus including a master lens, a converter lens that collectively has a negative refractive power and is in an optical path so that a focal length of an entire system becomes longer than a focal length of the master lens alone, and an image sensor, wherein the converter lens consists of a front unit having a positive refractive power and a rear unit having a negative refractive power, wherein the front unit has a combined refractive power having a maximum positive refractive power in a case where the combined refractive power is obtained by a refractive power of each lens being combined in order from the lens closest to an object to an image side, and wherein the following conditional expressions are satisfied:

$$0.11 < f1/(|EXT\_f| \times \beta) \leq 0.257$$

$$1.00 < L/(sk \times \beta) < 4.00$$

where f1 is a focal length of the front unit, EXT_f is a focal length of the converter lens, β is a lateral magnification of the converter lens when the converter lens is disposed on an image side of the master lens, L is a distance on an optical axis from a lens surface closest to the object in the converter lens to a lens surface closest to the image plane in the converter lens, and sk is a distance on the optical axis from a lens surface closest to the image plane in the converter lens to the image plane when the converter lens is disposed on an image side of the master lens.

* * * * *